US005799203A

United States Patent [19]
Lee et al.

[11] Patent Number: 5,799,203
[45] Date of Patent: Aug. 25, 1998

[54] SYSTEM FOR RECEIVING PERIPHERAL DEVICE CAPABILITY INFORMATION AND SELECTIVELY DISABLING CORRESPONDING PROCESSING UNIT FUNCTION WHEN THE DEVICE FAILING TO SUPPORT SUCH FUNCTION

[75] Inventors: Sherman Lee, Rancho Palos Verdes, Calif.; James R. MacDonald, Buda; Michael T. Wisor, Austin, both of Tex.

[73] Assignee: Advanced Micro Devices, Inc., Sunnyvale, Calif.

[21] Appl. No.: 649,537

[22] Filed: May 17, 1996

[51] Int. Cl.$^6$ ........................................ G06F 13/00
[52] U.S. Cl. .................. 395/828; 395/829; 395/834; 395/836; 395/856; 395/284; 395/852; 395/564; 370/437
[58] Field of Search ................ 395/183.19, 870, 395/500, 829, 284, 564, 852, 883; 370/437

[56] References Cited

U.S. PATENT DOCUMENTS

| | | | |
|---|---|---|---|
| 4,327,408 | 4/1982 | Frissell | 395/183.19 |
| 4,339,797 | 7/1982 | Brereton et al. | 395/564 |
| 4,523,277 | 6/1985 | Schnathorst | 395/870 |
| 4,677,548 | 6/1987 | Bradley | 395/500 |
| 4,910,655 | 3/1990 | Ashkin | 395/829 |
| 4,998,498 | 3/1991 | Chan | 395/852 |
| 5,077,732 | 12/1991 | Bradley | 370/437 |
| 5,109,517 | 4/1992 | Houda et al. | 395/284 |
| 5,379,382 | 1/1995 | Work et al. | 395/883 |
| 5,524,269 | 6/1996 | Hamilton | 395/829 |

OTHER PUBLICATIONS

*AMD5$_K$86 Processor Technical Reference Manual*, 1986 Advanced Micro Devices, Inc., pp. 3-29 through 3-31.

*Primary Examiner*—Thomas C. Lee
*Assistant Examiner*—Thuy Pardo
*Attorney, Agent, or Firm*—Conley, Rose & Tayon, P.C.; B. Noel Kivlin

[57] ABSTRACT

A system and method for providing information regarding system support capabilities to a processor. A computer system includes a processing unit, a main memory and a first plurality of peripherals coupled to a first bus. A bus bridge couples the first bus to a second bus and a second plurality of support peripherals are coupled to the second bus. The processing unit is capable of providing requests for system support information to the bus bridge and the first and second plurality support peripherals. The peripherals are configured to provide responses to the request. The processing unit stores the responses and uses the information received to enable and disable its functional units or the peripheral's functional units accordingly. In one embodiment, the requests and information are provided along a dedicated serial interface. In another, the requests and information are provided as specialized bus cycles along the CPU bus.

28 Claims, 7 Drawing Sheets

SYSTEM FOR RECEIVING PERIPHERAL DEVICE CAPABILITY INFORMATION AND SELECTIVELY DISABLING CORRESPONDING PROCESSING UNIT FUNCTION WHEN THE DEVICE FAILING TO SUPPORT SUCH FUNCTION

BACKGROUND OF THE INVENTION

1. Field of the Invention

The present invention relates to computer systems and more particularly to a computer system in which a microprocessor and system support logic can communicate with one another concerning system attributes.

2. Description of the Related Art

Figure 1:
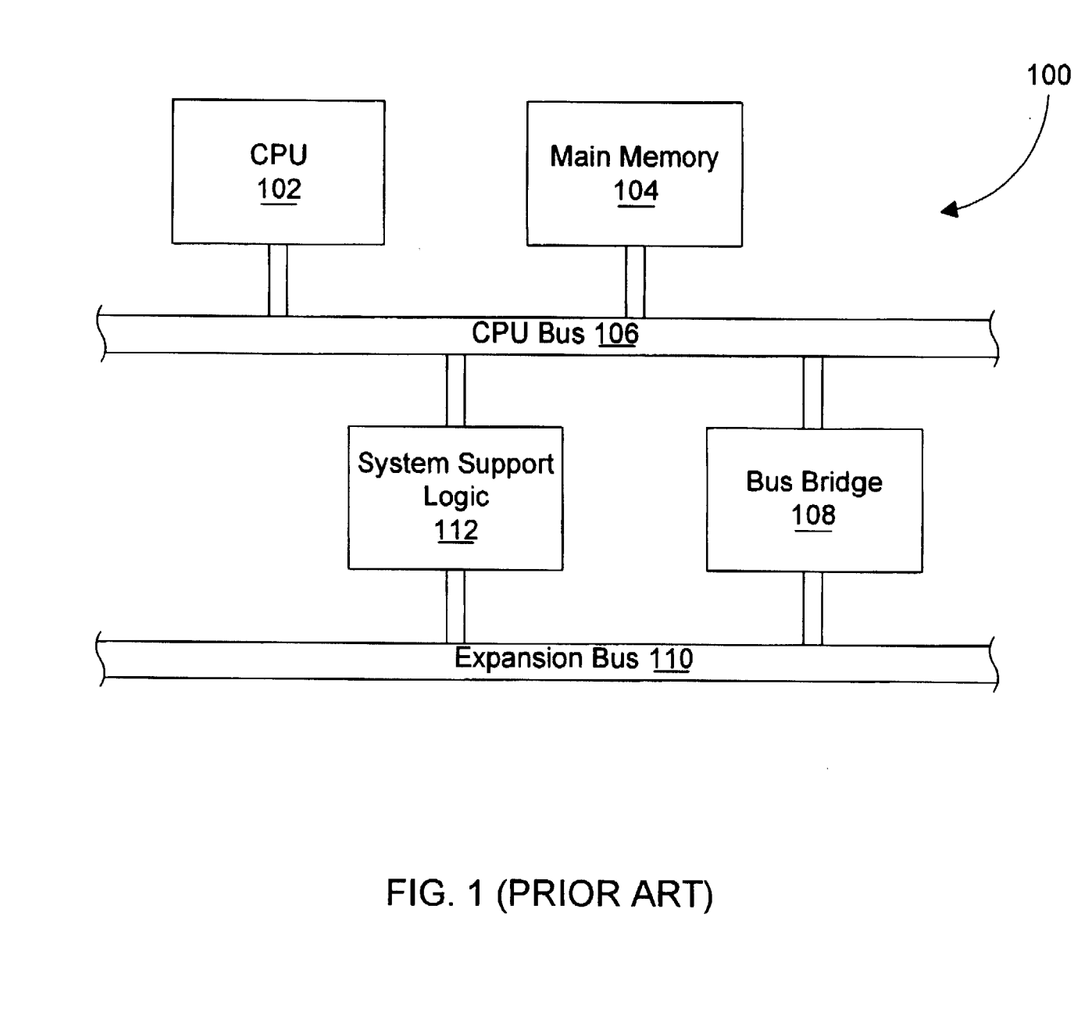
FIG. 1 is a block diagram of a computer system according to the prior art.

Personal computer systems require a microprocessor and a variety of system support logic. Support logic can include memory and cache controllers, bus controllers, DMA controllers, interrupt controllers, serial and parallel port controllers, floppy and hard disk drive controllers, timers, keyboard controllers, chip select and reset controller, and bus controllers. FIG. 1 illustrates a typical computer system 100. A CPU 102 and a main memory 104 are coupled to a CPU bus 106. CPU bus 106 in turn is coupled by way of a bus bridge 108 to an expansion bus 110. Various components of system support logic 112 are coupled to expansion bus 110 and/or CPU bus 106. In the figure shown, system support logic 112 is illustrated as a single integrated circuit but may be embodied in differing degrees of integration.

There is an increasing trend toward upgradability of computer systems wherein a succeeding generation of microprocessor is compatible with the preceding generation. In this way the user can operate his computer system by replacing one microprocessor with another. However, while the computer system may be upgraded by replacing one processor with another, the system support logic may not support all of the added functionality of the new processor. Similarly, the processor might not support all of the functions supported by the system support logic. For example, the cache support logic may not support a write-back cache, or have differing cache line sizes or snooping attributes than are supported by the upgrade processor. By way of additional example, the memory support logic may not provide the same port, speed, width, capacity, burst length or refresh attributes. Further, the support logic or the processor might support only a limited number of parallel and/or serial ports and chip selects. Thus, the new processor may not function correctly with the old set of system logic.

Accordingly, there is a need for a mechanism whereby a processor may query the system logic as to its support functionality and the processor can enable and disable those functions that are supported or not supported by the system support logic.

There is similarly a need for a mechanism whereby a processor can disable system support logic whose functions the processor itself does not support, thereby optimizing system performance.

SUMMARY OF THE INVENTION

Accordingly, there is provided a standard method by which system CPU support attributes may be reported to the CPU and ultimately the software running on the system. Those functions of the CPU not supported by the system support logic may be deactivated. Similarly, those functions which the system logic might support that are not supported by the CPU may be disabled. A computer system in accordance with one aspect of the invention includes a CPU and a main memory coupled to a CPU bus and a bus bridge coupling the CPU bus to an expansion bus. System support logic further may be coupled to the expansion bus and/or the CPU bus. A serial interface couples the CPU to the system support logic. The CPU interrogates the system support logic via the serial bus to determine its support functions. The system logic, which also includes a serial interface, responds to the queries with information concerning its functionality. The CPU then enables or disables its functionality according to its system support logic. The CPU stores the information concerning the support logic capabilities in a special set of machine specific registers.

According to an alternate embodiment of the present invention, the CPU and the system support logic include circuitry for generating and decoding a special bus cycle, whereby the CPU can query the system support logic as to the system attributes. The support logic responds to the special bus cycle with information concerning its capabilities. The CPU then stores information regarding system capabilities in a special set of machine specific registers while disabling those capabilities that are not supported by the logic. Once it has disabled its own capabilities, the CPU will enable or disable those functions of the system logic which it does not support.

Broadly speaking, the present invention contemplates a computer system including a central processing unit (CPU) and a peripheral device configured to provide information to the CPU of whether the CPU supports a predetermined function of the CPU. The CPU includes a control circuit coupled to receive the information from the peripheral device and configured to disable the function if the information indicates that the peripheral device does not support the function.

A method in accordance with one aspect of the present invention includes the steps of transmitting a request for system support capabilities from a processor to system support logic, providing the information to the processor and storing it. The method further includes the steps of accessing the information and enabling or disabling the functional units of the processor responsive to the information received.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 2:
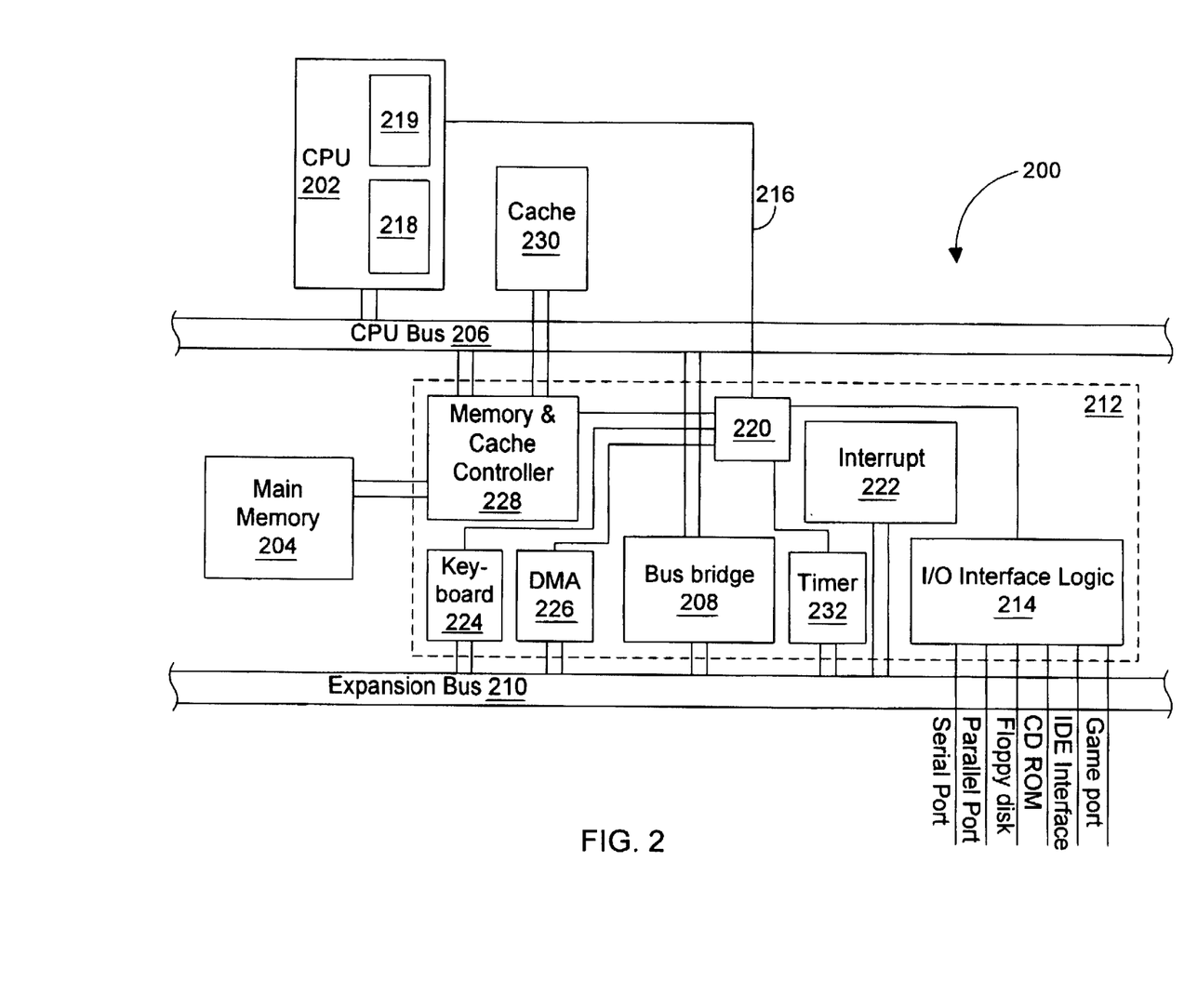
FIG. 2 is a block diagram of a computer system according to one aspect of the present invention.

Turning now to the drawings and with particular attention to FIG. 2, there is shown a computer system 200 according to one embodiment of the present invention. A CPU 202 is coupled to a CPU bus 206. CPU 202 may be any of a variety of commonly available processors, including those compatible with the 386, 486, Pentium, and PowerPC instruction sets. A memory/cache controller 228 couples a cache 230 and a main memory 204 to CPU bus 206. Cache memory 230 provides for increased data throughput by holding duplicate copies of data in static random access memory (SRAM). Memory/cache controller 228 may be part of system support logic 212. In the embodiment shown, system support logic 212 includes a bus bridge 208 coupling CPU bus 206 to expansion bus 210. Various components of system support logic 212 are coupled to expansion bus 210. However, it is noted that various components may alternatively be coupled to CPU bus 206.

Bus bridge 208 provides for control of expansion bus 210 as well as any buffering required for data transfers between the two buses. Expansion bus 210 may be any of a number of commonly available expansion buses, including the Industry Standard Architecture (ISA), the Extended Industry Standard Architecture (EISA), the Microchannel Architecture (MCA), or the Peripheral Component Interface (PCI) bus architecture. As mentioned previously, system support logic 212 may include a memory/cache controller 208 coupled to CPU bus 206, main memory 204 and cache 230. Memory/cache controller 208 supports the external cache as well as the main memory 204, and includes, among other things, snooping control and control of the memory configuration registers. System support logic 212 may further include a keyboard controller 224, a DMA controller 226, an interrupt controller 222, a timer control 230, and a general I/O controller 214. Keyboard controller 224 may be configured to provide support for both keyboard and mouse and is generally compatible with the 8042 and 8051 keyboard controllers. DMA controller 226 provides for the direct transfer by external devices of data from main memory 204. Interrupt controller 222 is configured to receive interrupts from external devices, and process and prioritize them, before delivering them to the CPU 202. Timer control circuit 230 is configured to provide any necessary timing and clock signals. Finally, general I/O controller 212 is configured to provide controls for serial and parallel ports, CD ROM drives, floppy disk drives, IDE interface, game port interface, chips selects and fast reset/A20 control. It is noted that the various support components of system support logic 212 may be integrated together or integrated in various combinations. Thus, FIG. 2 is exemplary only.

Computer system 200 further includes a serial bus 216 coupling system support logic 212 to CPU 202. Serial bus 216 is used to transmit system support information from the system support logic 212 to the CPU 202. Thus, CPU 202 includes a serial bus interface 219 and registers or storage units 218 configured to receive data transmitted along serial bus 216. System support logic 212 also includes a serial bus interface 220. Registers or storage locations 218 in CPU 202 are used to store system configuration information to make such information available to device drivers via a software application programming interface (API). Upon reset, microcode in CPU 202 will inquire along serial bus 216 as to system support logic 212's CPU support capabilities.

As discussed above, a variety of functionality may be provided to system support logic 212. Thus, each component may, in a predetermined fashion, transmit its capabilities along serial bus 216. For example, memory/cache controller 228 may provide information concerning which processors it will support and whether it will provide support for serial or parallel, write though or write back cache, and whether it will provide support for predetermined or programmable cache line size. The memory/cache controller 228 may further provide information concerning memory capacity, memory speed, memory width, burst length (typically 2, 4, 8 or 16 double words), memory attributes (such as write protect), and refresh support. Interrupt controller 222 may provide information concerning its characteristics. Further, general I/O controller 214 may provide information on its various functionalities. For example, general I/O controller 214 may provide information concerning the number and type of parallel ports it supports. These can include uni- and bi-directional parallel ports and any of the enhanced or extended capabilities parallel ports currently available.

System support logic 212 will respond to the CPU 202 by providing this data to the CPU 202 across the serial bus 216. The CPU 202 will store this support information in machine specific registers 218. CPU 202 will then configure its internal functionality according to the information it has received. CPU 202 will also enable or disable the system support logic depending on whether the CPU supports its functions.

Figure 3:
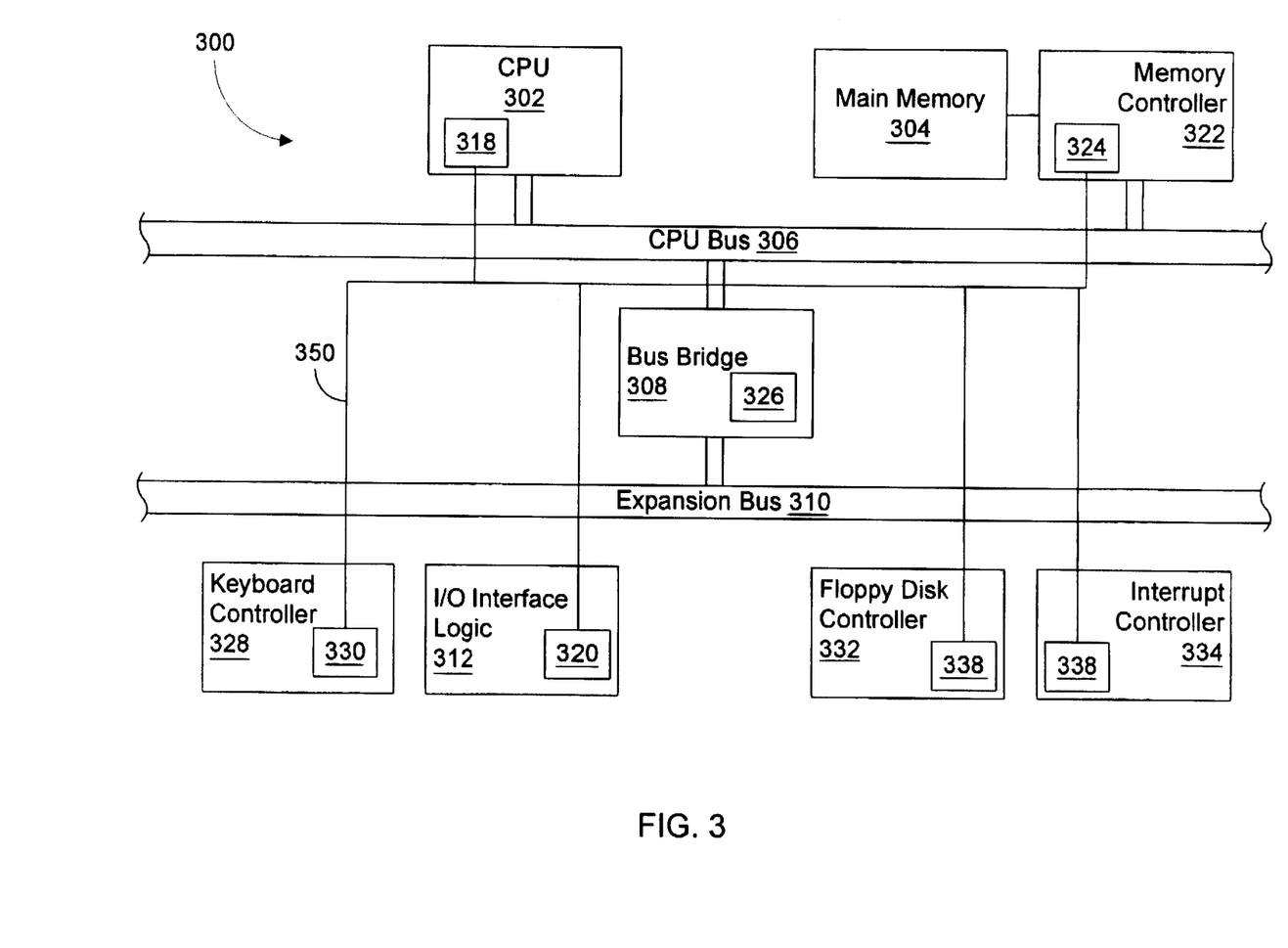
FIG. 3 is a block diagram of another aspect of the embodiment of the present invention shown in FIG. 2.

As noted above, a variety of system support logic configurations are available. For example, turning now to FIG. 3, a block diagram is shown of a computer system employing a lesser degree of system support logic integration. Computer system 300 includes a CPU 302 coupled to a CPU bus 306. A bus bridge 308 couples CPU bus 306 to an expansion bus 310. A memory controller 322 is coupled to main memory 304 and CPU bus 322. A keyboard controller 328, a floppy disk controller 332, an interrupt controller 334, and an I/O Interface logic 312 are coupled to expansion bus 310. A serial bus 350 couples CPU 302 to each support peripheral. Thus, CPU 302, memory controller 322, keyboard controller 328, I/O interface logic 312, floppy disk controller 332, bus bridge 308, and interrupt controller 334 are each configured with a serial interface 328, 324, 330, 320, 336, 326, and 338, respectively. As discussed above, the CPU 302 is configured to query the support logic along the serial bus 350 as to its support capabilities. The various support peripherals will respond to the query by identifying their functionality. The CPU 302 will store the configuration information in dedicated storage units or dedicated memory. The CPU 302 will then enable or disable its functional units, or the system's functional units, in accordance with the stored configuration information.

Figure 4:
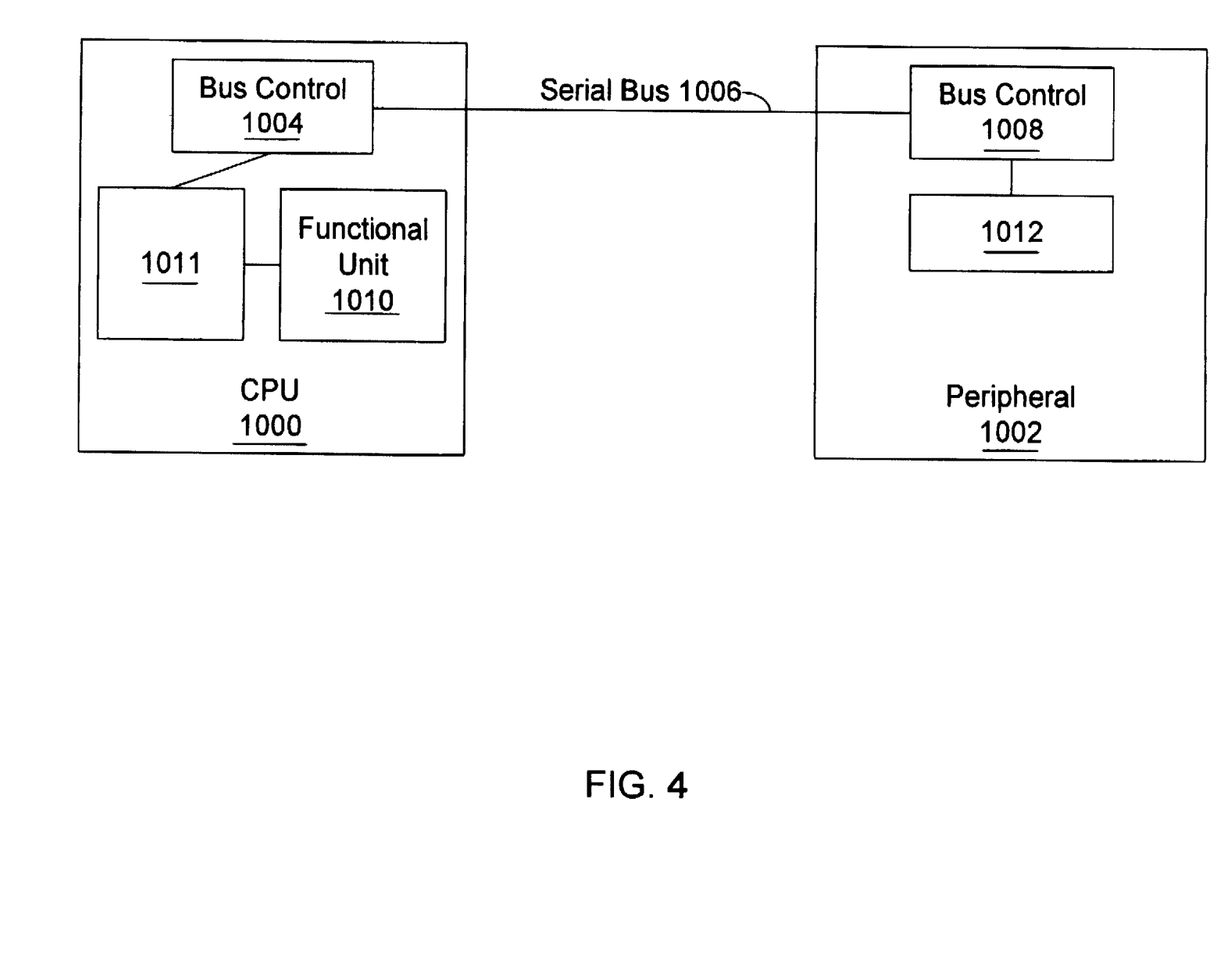
FIG. 4 is a more detailed block diagram of an aspect of the present invention.

For example, turning now to FIG. 4, an exemplary system identification mechanism is shown. A CPU 1000 is coupled to a peripheral device 1002 by way of a serial bus 1006. CPU 1000 includes a serial bus control unit 1004. Similar control unit 1008 is included in peripheral device 1002. Peripheral device 1002 includes a support identification circuit 1012 coupled to bus control 1008. Support identification circuit 1012 is configured to supply information along serial bus 1006 as to peripheral device 1002's support capabilities. CPU 1000 further includes a support control circuit 1011 coupled to serial bus control 1004. Support control circuit 1011 is coupled to functional unit 1010 and, in response to CPU microcode, is configured to inquire along serial bus 1006 as to whether peripheral 1002 supports that functional unit. Functional unit 1010 may be a burst control circuit, which controls, inter alia, burst length and capacity. If, for example, peripheral device 1002 supports a burst length of only eight double words, this information will be stored in or otherwise provided to support identification circuit 1012. Upon reset, CPU 1000 will inquire along serial bus 1006 via support control circuit 1011 as to the burst length supported by peripheral 1002. This information will be provided from support identification circuit 1012. Support control circuit 1011 will receive this information from serial bus 1006. Assuming, for example, that CPU 1000 can support burst lengths of up to 16 doublewords, support control circuit 1011 will disable this aspect of CPU 1000's functionality. Thus, CPU 1000 will support only burst lengths of eight doublewords, thereby maintaining compatibility with peripheral device 1002. If the peripheral device supported additional features not supported by CPU 100, support control unit 1011 would cause those functional units on peripheral device 1002 to be disabled.

Figure 5:
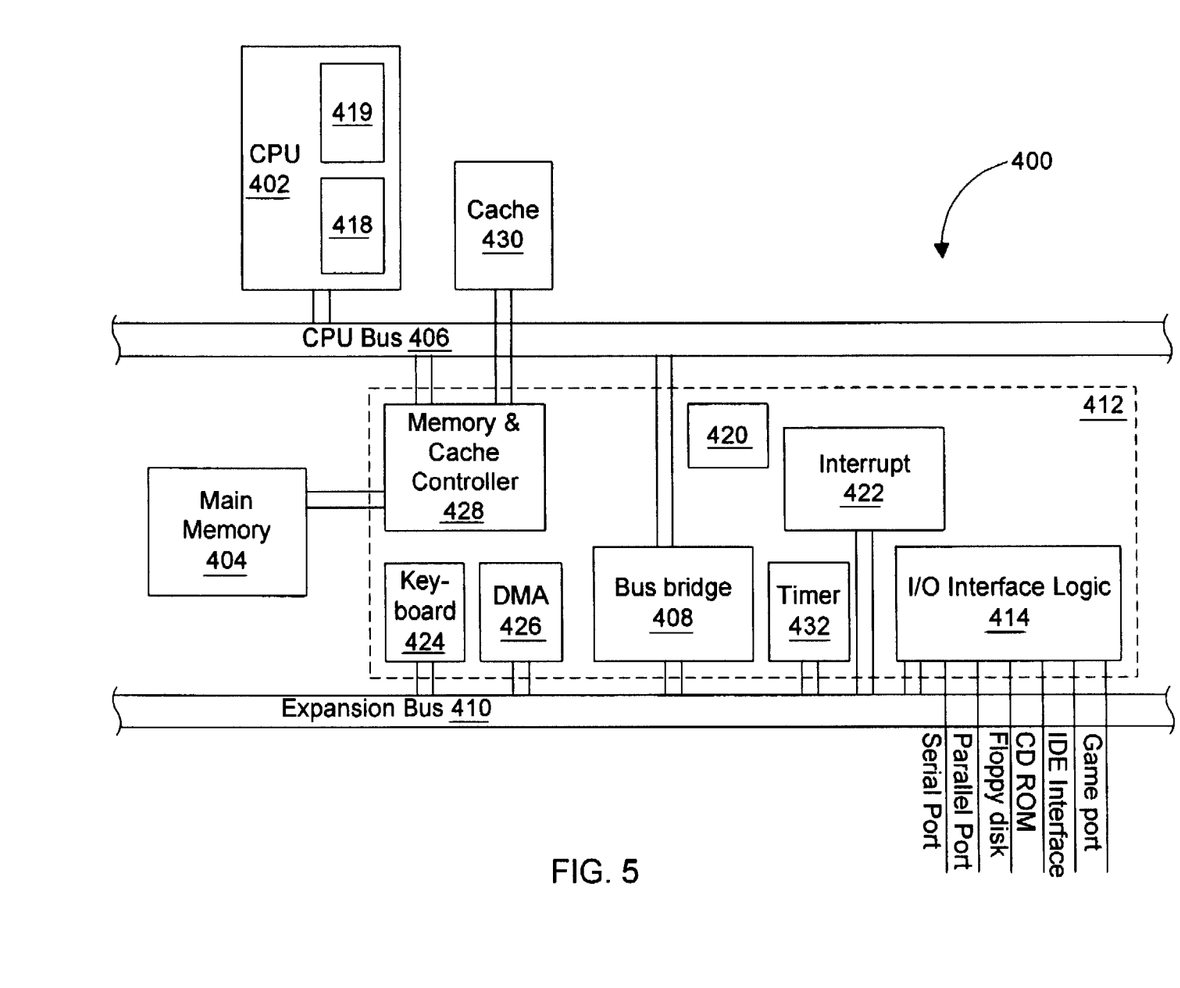
FIG. 5 is a block diagram of another embodiment of the present invention.

In an alternate embodiment, the computer system may be configured to allow the transfer of system support information across various interfaces using specially defined cycles which are transferred across one or more of the buses incorporated within the system. This will best be understood with reference to FIG. 5. FIG. 5 is a block diagram of a computer system as generally represented in FIG. 2 but without the serial bus and interface. Computer system 400 includes a CPU 402 and a main memory 404 coupled to a CPU bus 406. CPU 402 includes bus cycle encoder/decoder 419. CPU bus 406 in turn is coupled to bus bridge 408 and expansion bus 410. System support logic 412 includes bus cycle encoder/decoder 420. System support logic 412 is coupled to expansion bus 410. CPU 402 is provided with control circuitry to generate a specialized bus cycle or a memory or I/O cycle to a dedicated memory location querying system support logic 412 as to its support capabilities. System support logic 412 is configured with control circuitry to decode these bus cycles and to generate a specialized bus cycle or cycles identifying its capabilities in response.

Figure 6:
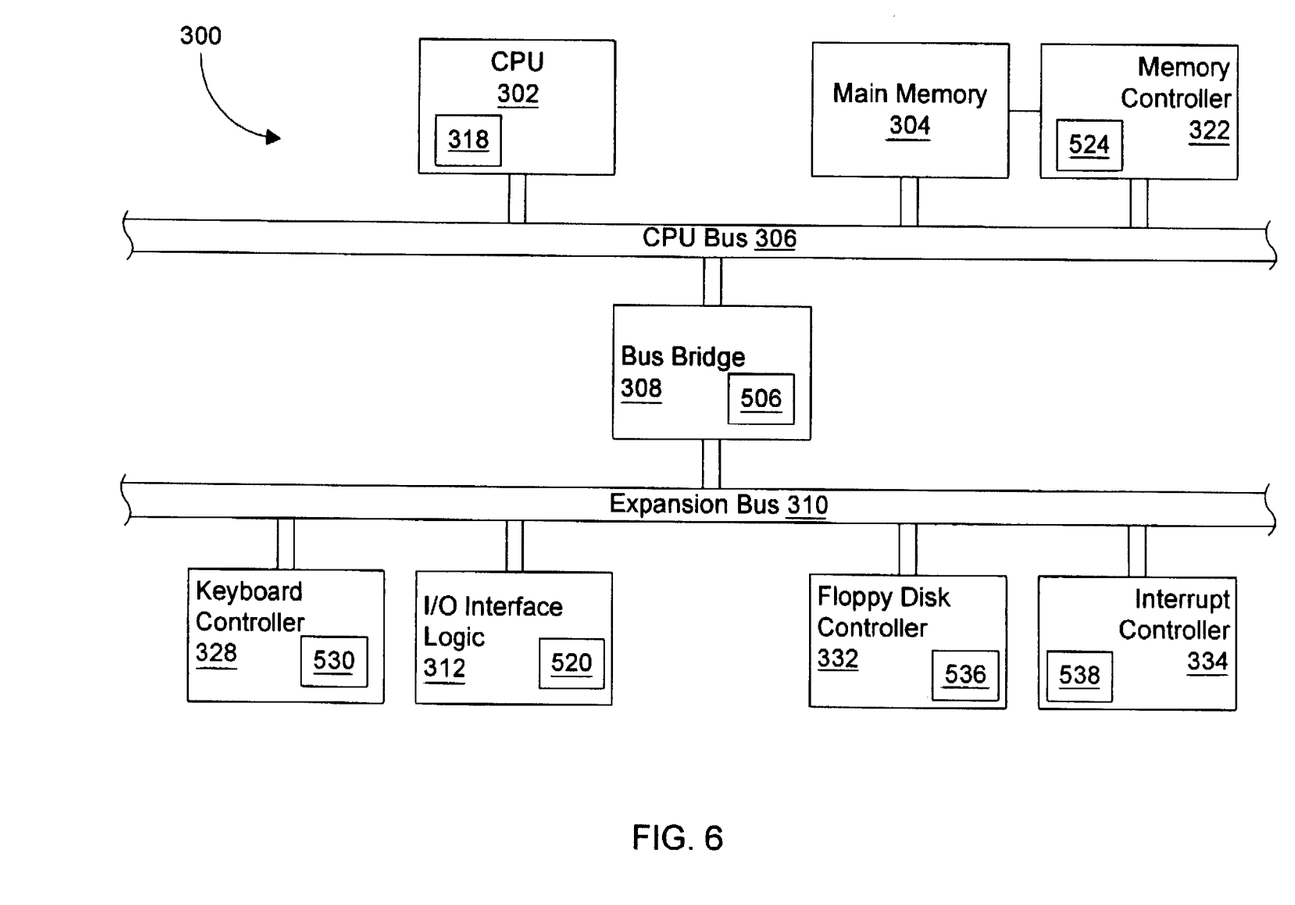
FIG. 6 is a block diagram of a still further embodiment of the present invention.

CPU 402 is configured to issue the specialized bus cycles upon system reset to system support logic 412. System support logic 412 responds with data cycles of its own indicating its system support capabilities. In response to the information received, CPU 402 stores the system capabilities in configuration device specific registers or storage units 418. Software APIs may be used to access the storage units in the manner described with respect to FIG. 2, and the CPU may enable or disable its functional units or the functional units of the system logic itself accordingly. It is further noted, again, that system support logic can be embedded in a lesser degree of integration. Thus, FIG. 6 illustrates a block diagram on a computer system employing system support logic having discrete components as in FIG. 3. Similar to the embodiment shown in FIG. 3, each component of support logic includes a bus cycle coder/decoder to generate system support information on the bus for the CPU to read. The CPU includes an encoder/decoder to generate bus cycles querying the system support logic as to their capabilities, as well as circuitry configured to command the disabling of system logic functional units.

Figure 7:
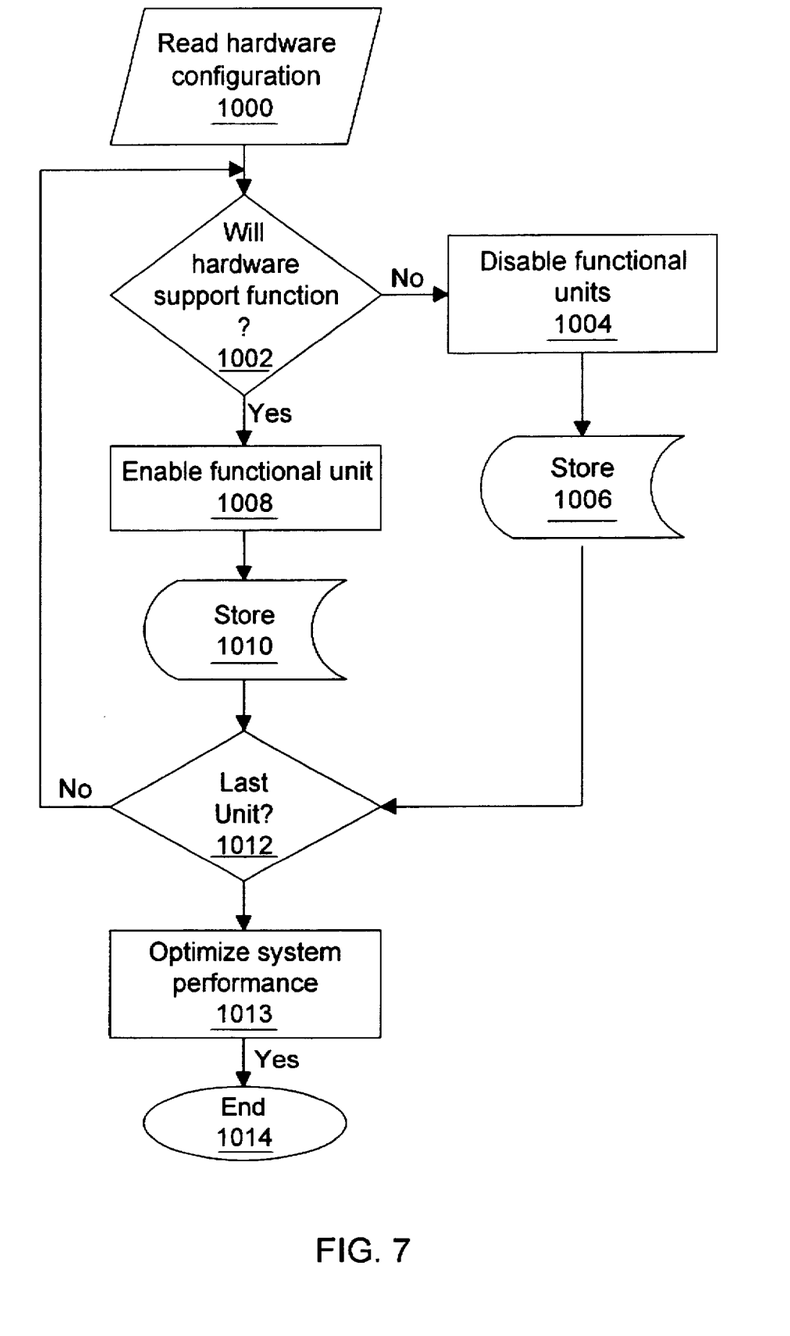
FIG. 7 is a flow chart illustrating a method according to an embodiment of the present invention.

Turning now to FIG. 7, there is shown a flow diagram of a method for determining system support functionality and configuring the CPU in response thereto. Initially the CPU, upon reset, will read the hardware (step 1000). This can occur either via a specific serial bus or through special CPU and expansion bus cycles. Once the hardware configuration has been read, the CPU determines which of its functional units the hardware will support (step 1002). If not supported, the CPU will disable the functional unit (step 1004). The fact that the functional unit has been disabled is stored in machine specific registers within the CPU in step 1006. If, however, in step 1002 the hardware has been determined to be able to support the functional unit, the functional unit will be enabled (step 1008). This information is then stored in machine specific registers in step 1010. The process will proceed for each component of support logic. Once the enabling/disabling of the CPU functional units is completed, a global optimization procedure 1013 is initiated so as to tune or balance system performance. This can include disabling functional units on the support logic that are not supported by the CPU.

In accordance with the computer system described above, upgradeability and hence compatibility across generations of computers is achieved. System support functionality is provided either by way of specialized bus cycles or by way of a dedicated serial interface between the CPU and the system support logic. In this manner, users may be assured that a processor upgrade will not require replacement of system logic as well.

Numerous variations and modifications will become apparent to those skilled in the art once the above disclosure is fully appreciated. It is intended that the following claims be interpreted to embrace all such variations and modifications.

We claim:
1. A computer system, comprising:
   a central processing unit (CPU); and
   a peripheral device operatively coupled to said CPU and configured to provide information indicative of whether said peripheral device supports a predetermined function of said CPU, wherein said CPU includes a control circuit coupled to receive said information from said peripheral device and is configured to disable said predetermined function of said CPU if said information indicates that said peripheral device does not support said predetermined function, and wherein said peripheral device is selected from the group consisting of: memory controllers, cache controllers, bus controllers, DMA controllers, interrupt controllers, serial port controllers, parallel controllers, floppy disk drive controllers, hard disk drive controllers, timers, keyboard controllers, chip select controllers, reset controllers, and bus controllers.

2. The computer system of claim 1, wherein said CPU is further configured to disable a function of said peripheral device if said CPU does not support said function.

3. The computer system of claim 1, wherein said information is provided via a serial interface coupling said CPU and said peripheral device.

4. The computer system of claim 1, wherein said information is provided via a bus cycle on an expansion bus.

5. The computer system of claim 1, wherein said CPU is configured to request said information responsive to a command from microcode upon system reset.

6. The computer system of claim 5 wherein said CPU is configured to store said information.

7. The computer system of claim 6 wherein said CPU is configured to provide said information to system software.

8. A computer system, comprising:

a processing unit coupled to a first bus;

a main memory coupled to said first bus;

a first plurality of support peripherals coupled to said first bus;

a bus bridge coupling said first bus to a second bus, a second plurality of support peripherals coupled to said second bus; wherein each of said processing unit, said bus bridge and said first and second plurality of support peripherals is provided with a serial bus interface, said serial bus interface supporting a serial bus intercoupling said processing unit with said bus bridge and said first and second plurality of support peripherals, wherein said processing unit is configured to issue a request along said serial bus to said bus bridge and said first and second plurality of support peripherals as to processor support capabilities and said bus bridge and said first and second plurality of support peripherals are configured to respond to said request along said serial bus.

9. The computer system of claim 8, wherein said processing unit further includes dedicated storage units for storing responses from said bus bridge and said first and second plurality of peripheral devices to said request as to processor support capabilities.

10. The computer system of claim 9, wherein said processing unit is further configured to enable and disable processor functional units responsive to said responses stored in said dedicated storage units.

11. The computer system of claim 10, wherein said processing unit is further configured to disable peripheral functional units.

12. A computer system, comprising:

a processing unit coupled to a first bus;

a main memory coupled to said first bus;

a first plurality of support peripherals coupled to said first bus;

a bus bridge coupling said first bus to a second bus, and a second plurality of support peripherals coupled to said second bus; wherein processing unit is configured with control circuitry to provide specialized bus cycles requesting system support information to said bus bridge and said first and second plurality of support peripherals.

13. The computer system of claim 12, wherein said bus bridge and said first and second plurality of support peripherals are provided with bus control circuitry configured to decode said specialized bus cycles from said processing unit and to provide responses to said specialized bus cycles to said processing unit.

14. The computer system of claim 13, wherein said processing unit further includes dedicated storage units for storing responses from said bus bridge and said first and second plurality of peripheral devices to said request as to processor support capabilities.

15. The computer system of claim 14, wherein said processing unit is further configured to disable functional units responsive to said responses stored in said dedicated storage units.

16. The computer system of claim 15, wherein said processing unit is further configured to disable peripheral functional units responsive to said responses stored in said dedicated functional units.

17. A computer system, comprising:

a processing unit coupled to a first bus;

a main memory coupled to said first bus;

a first plurality of support peripherals coupled to said first bus;

a bus bridge coupling said first bus to a second bus; and a second plurality of support peripherals coupled to said second bus; wherein processing unit is configured to provide requests for system support information to said bus bridge and said first and second plurality of support peripherals.

18. The computer system of claim 17, wherein said bus bridge and said first and second plurality of support peripherals are configured to provide said processing unit with system support information regarding their support capabilities in response to said requests received from said processing unit.

19. The computer system of claim 18, wherein said processing unit further includes dedicated storage units for storing system support information from said bus bridge and said first and second plurality of peripheral devices in response to said requests received from said processing unit.

20. The computer system of claim 19, wherein said processing unit is further configured to disable functional units responsive to said responses stored in said dedicated storage units.

21. The computer system of claim 18, wherein said requests are transmitted to said bus bridge and said first and second plurality of support peripherals as dedicated bus cycles on said first or second buses.

22. The computer system of claim 18, further including a serial bus intercoupling said processing unit and said first and second plurality of support peripherals, wherein said requests are transmitted to said bus bridge and said first and second plurality of support peripherals along said serial bus.

23. The computer system of claim 20, wherein said processing unit is configured to disable functional least one said bus bridge and said first and second plurality of functional units responsive to said responses stored in said dedicated storage units.

24. A method for ensuring compatibility between a processor and system support logic in an upgradeable computer system, comprising:

transmitting a request for system support capabilities from said processor to said system support logic, wherein said system support logic is selected from the group consisting of: memory controllers, cache controllers, bus controllers, DMA controllers, interrupt controllers, serial port controllers, parallel controllers, floppy disk drive controllers, hard disk drive controllers, timers, keyboard controllers, chip select controllers, reset controllers, and bus controllers;

providing information regarding said system support capabilities from said system support logic to said processor in response to said request;

storing said information;

accessing said information; and enabling and disabling functional units responsive to said information.

25. The method of claim 24, wherein said request and said information are transmitted via specialized bus cycles on a CPU bus.

26. The method of claim 25 wherein said request and said information are transmitted via a dedicated serial bus.

27. The method of claim 24, wherein said enabling and disabling includes enabling and disabling processor functional units.

28. The method of claim 27, wherein said enabling and disabling includes enabling and disabling support logic functional units.

* * * * *